US012730569B2

(12) United States Patent
Khan M M et al.

(10) Patent No.: US 12,730,569 B2
(45) Date of Patent: Sep. 8, 2026

(54) MANAGING POWER STATES IN A DATA STORAGE DEVICE

(71) Applicant: Sandisk Technologies, Inc., Milpitas, CA (US)

(72) Inventors: Saud Mansoor Khan M M, Bangalore (IN); Praveen Kumar Boda, Bangalore (IN); Tejasree CH, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/989,198

(22) Filed: Dec. 20, 2024

(65) Prior Publication Data

US 2026/0178206 A1 Jun. 25, 2026

(51) Int. Cl.
*G06F 3/06* (2006.01)

(52) U.S. Cl.
CPC .......... *G06F 3/0625* (2013.01); *G06F 3/0655* (2013.01); *G06F 3/0679* (2013.01)

(58) Field of Classification Search
CPC ..... G06F 3/0625; G06F 3/0655; G06F 3/0679
See application file for complete search history.

(56) References Cited

U.S. PATENT DOCUMENTS

| | | | | |
|---|---|---|---|---|
| 5,724,592 | A * | 3/1998 | Garner | G06F 1/3275 711/167 |
| 9,213,393 | B2 | 12/2015 | Cooper et al. | |
| 10,209,911 | B2 | 2/2019 | Chin et al. | |
| 11,543,996 | B2 | 1/2023 | Heller et al. | |
| 11,640,251 | B2 | 5/2023 | Benisty et al. | |
| 2019/0227725 | A1 * | 7/2019 | Afriat | G06F 3/0653 |
| 2022/0301598 | A1 * | 9/2022 | Eemani | G11C 7/04 |
| 2022/0391090 | A1 * | 12/2022 | Muthiah | G06N 5/022 |
| 2024/0094287 | A1 | 3/2024 | De La Puente et al. | |

* cited by examiner

*Primary Examiner* — Larry T Mackall
(74) *Attorney, Agent, or Firm* — LOZA & LOZA, LLP; Gabriel Fitch

(57) ABSTRACT

The disclosure relates in some aspects to managing power states in a data storage device. A data storage device may receive a request from a host device to transition to a particular power state. Such a request may be used to cause the data storage device to transition to a corresponding internal power state. In some scenarios, the host device might not support the same internal power states that are supported by the data storage device. In this case, the data storage device may transition to an internal power state that is lower than the internal power state supported by the host device in conjunction with the request.

20 Claims, 12 Drawing Sheets

1106

RESPONSIVE TO THE RECEIPT OF THE REQUEST AND THE DETERMINATION THAT THE HOST DEVICE DOES NOT SUPPORT THE L1.2 LINK STATE, PERFORM AT LEAST ONE OF:

SUSPEND AT LEAST ONE DATA STORAGE THREAD;

CONFIGURE AT LEAST ONE COMPONENT OF THE DATA STORAGE DEVICE TO TRANSITION FROM A FIRST POWER STATE TO A SECOND POWER STATE THAT IS ASSOCIATED WITH LOWER POWER CONSUMPTION THAN THE FIRST POWER STATE (E.G,. SET OR CLEAR AT LEAST ONE BIT IN AT LEAST ONE REGISTER THAT CONTROLS THE AT LEAST ONE COMPONENT); OR

POWER OFF AT LEAST ONE OF A PROCESSING CORE, A MEMORY CIRCUIT, OR A PHASE-LOCKED LOOP (PLL) (E.G., SET OR CLEAR AT LEAST ONE BIT IN AT LEAST ONE REGISTER THAT CONTROLS THE AT LEAST ONE OF THE PROCESSING CORE, THE MEMORY CIRCUIT, OR THE PLL)

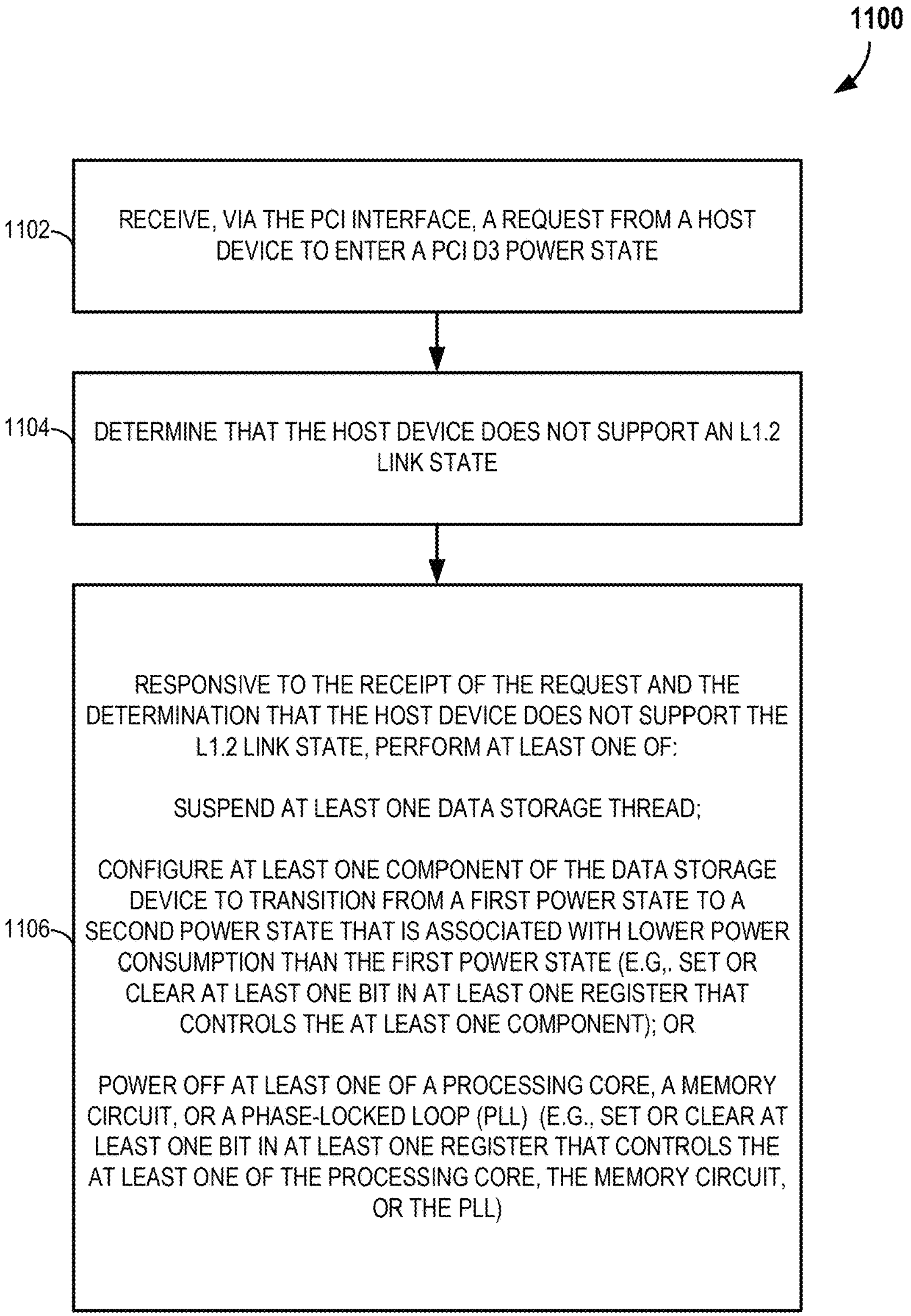

FIG. 11

MANAGING POWER STATES IN A DATA STORAGE DEVICE

FIELD

The disclosure relates, in some embodiments, to data storage devices such as non-volatile memory (NVM) devices and memory controllers and host devices for use therewith. More specifically, but not exclusively, the disclosure relates to managing power states in a data storage device.

INTRODUCTION

In consumer electronics, solid state devices (hereafter referred to as SSDs) or other data storage devices (DSDs) incorporating non-volatile memories (NVMs), such as flash NAND memories, are often replacing or supplementing conventional rotating hard disk drives for mass storage in many consumer or industrial electronics and computers. In a typical SSD storage device-based product (e.g., a solid state drive), a host device includes or communicates with an NVM device controller that in turn controls access to one or more NVM devices (e.g., NVM arrays). For example, the host device may issue write commands and read commands to an NVM device controller to write data to and read data from an SSD storage device.

A host device may control power states in a data storage device (e.g., an SSD storage device) to reduce power consumption in certain situations. For example, when the host device does not have any pending write commands or read commands to send to a data storage device, the host device may instruct the data storage device to transition to a lower power state. In some examples, a transition to a lower power state may involve temporarily disabling one or more components of the data storage device.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes a non-volatile memory array, a peripheral component interconnect (PCI) interface, and at least one processor coupled to the non-volatile memory array and the PCI interface. In one example, the at least one processor is configured to: receive, via the PCI interface, a request from a host device to enter a PCI D3 power state, determine that the host device does not support an L1.2 link state, and set a first power state of the data storage device to a non-operational power state responsive to the receipt of the request and the determination that the host device does not support the L1.2 link state.

One embodiment of the disclosure provides a method for controlling at least one power state of a data storage device. In one example, the method includes: receiving a request from a host device to enter a peripheral component interconnect (PCI) D3 power state, determining that the host device does not support an L1.2 link state, and setting a first power state of the data storage device to a non-operational power state responsive to the receipt of the request and the determination that the host device does not support the L1.2 link state.

One embodiment of the disclosure provides a data storage device. In one example, the data storage device includes: means for receiving a request from a host device to enter a peripheral component interconnect (PCI) D3 power state, means for determining that the host device does not support an L1.2 link state, and means for setting a first power state of the data storage device to a non-operational power state responsive to the receipt of the request and the determination that the host device does not support the L1.2 link state.

One embodiment of the disclosure provides a non-transitory computer-readable medium storing computer-executable code for storing data. In one example, the computer-readable medium includes code to: receive a request from a host device to enter a peripheral component interconnect (PCI) D3 power state, determine that the host device does not support an L1.2 link state, and set a first power state of the data storage device to a non-operational power state responsive to the receipt of the request and the determination that the host device does not support the L1.2 link state.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 11 illustrates another example of power state management operations in accordance with one or more aspects of the disclosure.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The disclosure relates in some aspects to various apparatuses, systems, methods, and media for managing power states in a data storage device. A data storage device may receive a request from a host device to transition to a particular power state. Such a request may be used to cause the data storage device to transition to a corresponding internal power state. In some scenarios, the host device might not support the same internal power states that are supported by the data storage device. In this case, the data storage device may transition to an internal power state that is lower than the internal power state supported by the host device in conjunction with the request.

For purposes of illustration, various aspects of the disclosure will be described in the context of a memory system that includes NAND memory technology. A NAND device may be referred to herein as a NAND Flash memory, a NAND memory device, a NAND flash, or a NAND. Generally speaking, a NAND device is a non-volatile memory having high storage density, fast access time, low power requirements in operation and advantageous shock resistance, compared to more conventional memory platforms. Raw NAND devices may be equipped (e.g., configured) with a serial interface such as Open NAND Flash Interface (ONFi), Common Flash Memory Interface (CFI), and the like. NAND devices may be configured as discrete memory chips or packaged with a controller to form a secure digital (SD) memory card, Multi Media Card (MMC), or a solid state disk. A NAND device may be configured with a single flash die, or a plurality of dies. In addition to memory cells, a NAND device may include other components, such as control/address logic components, I/O components, and data register components. It should be appreciated that the teachings herein are also applicable to other forms of memory (e.g., NVM other than NAND devices). For example, at least some aspects described herein may be applicable to phase-change memory (PCM) arrays, magneto-resistive random access memory (MRAM) arrays, and resistive random access memory (ReRAM) arrays.

Example Memory System

Figure 1:
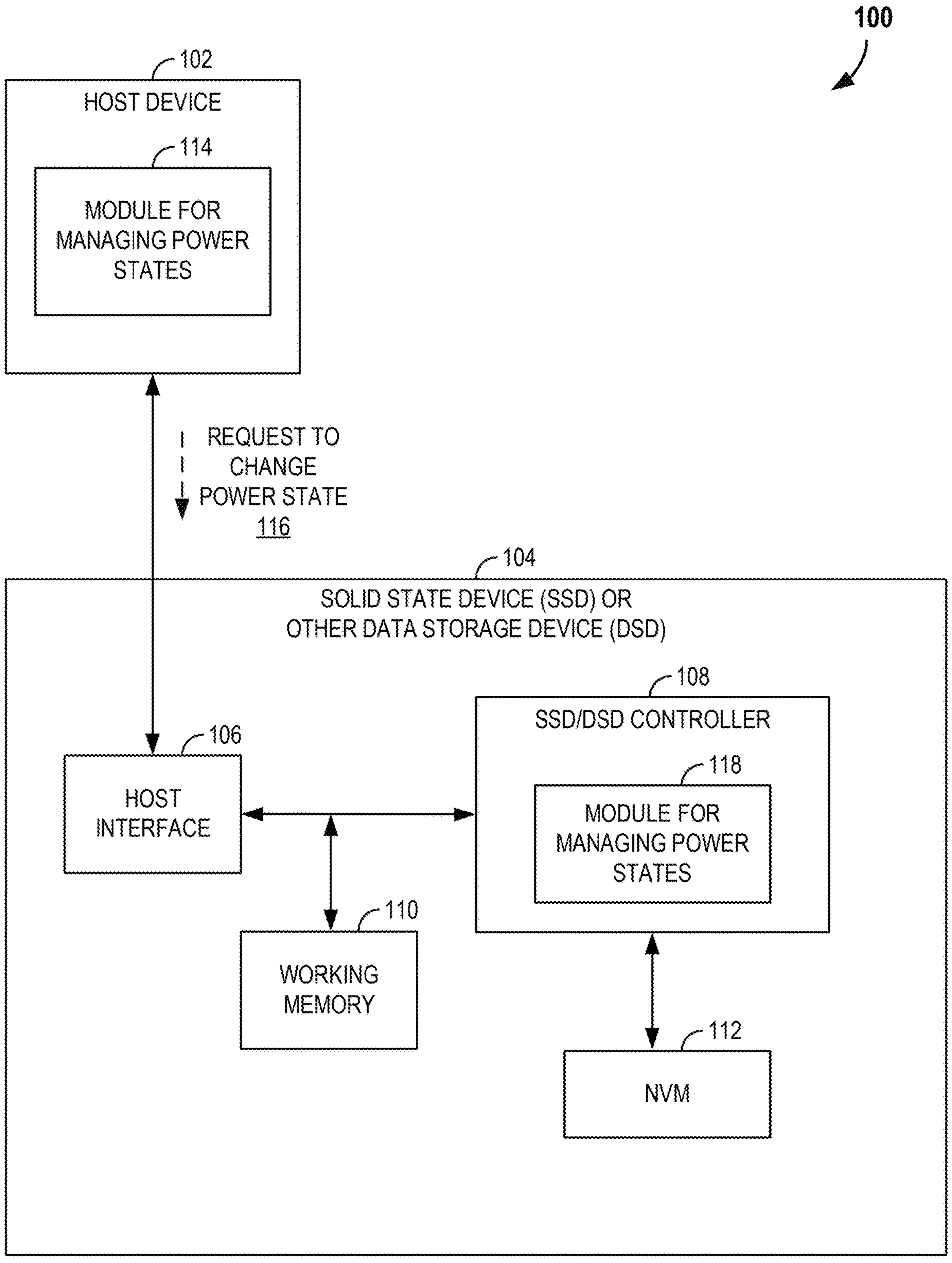
FIG. 1 illustrates an example data storage device (DSD) embodied as a solid-state device (SSD) configured in accordance with one or more aspects of the disclosure.

FIG. 1 illustrates an embodiment of a memory system 100 that includes a host device 102 and a solid state device (SSD) or other data storage device (DSD) 104 communicatively coupled to the host device 102. For brevity, the SSD/DSD 104 may be referred to herein as the SSD 104. The host device (e.g., a host computer) 102 provides commands to the SSD 104 for transferring data between the host device 102 and the SSD 104. For example, the host device 102 may provide a write command to the SSD 104 for writing data to the SSD 104 or a read command to the SSD 104 for reading data from the SSD 104. The host device 102 may be any system or device having a need for data storage or retrieval and a compatible interface for communicating with the SSD 104. For example, the host device 102 may be a computing device, a personal computer, a portable computer, or workstation, a server, a personal digital assistant, a digital camera, a digital phone, or the like.

The SSD 104 includes a host interface 106, an SSD/DSD controller 108, a working memory 110, and a non-volatile memory (NVM) 112. For brevity, the SSD/DSD controller 108 may be referred to herein as the SSD controller 108. The host interface 106 is coupled to the SSD controller 108 and facilitates communication between the host device 102 and the SSD controller 108. Additionally, the SSD controller 108 is coupled to the working memory 110 and the NVM 112. The host interface 106 may be any type of communication interface, such as peripheral component interconnect (PCI) interface, a PCI Express (PCIe) interface, an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. For example, PCIe is a high-speed serial computer expansion bus standard published by the PCI special interest group (PCI-SIG) that specifies an interface used by expansion cards (e.g., graphics cards, SSDs, etc.) that plug into the expansion slots on a motherboard of a personal computer.

In some embodiments, the host device 102 includes the SSD 104 (e.g., the host device 102 and the SSD 104 are implemented as a single component). In other embodiments, the SSD 104 is remote with respect to the host device 102 or is contained in a remote computing system coupled in communication with the host device 102. For example, the host device 102 may communicate with the SSD 104 through a wireless communication link.

The SSD controller 108 controls operation of the SSD 104. In various embodiments, the SSD controller 108 receives commands from the host device 102 through the host interface 106 and performs the commands to transfer data between the host device 102 and the NVM 112. In addition, the SSD controller 108 performs internal operations such as garbage collection operations, data integrity operations, and wear leveling operations. In some examples, the SSD controller 108 may execute the above operations and/or other operations as processing threads (typically referred to simply as threads), where a given thread may correspond to a particular set of instructions that can be independently scheduled for execution. The SSD controller 108 may execute such threads in series and/or in parallel.

The SSD controller 108 may include any type of processing device, such as a microprocessor, a microcontroller, an embedded controller, a logic circuit, software, firmware, or the like, for controlling operation of the SSD 104.

In some embodiments, some or all of the functions described herein as being performed by the SSD controller 108 may instead be performed by another element of the SSD 104. For example, the SSD 104 may include a microprocessor, a microcontroller, an embedded controller, a logic circuit, an application-specific integrated circuit (ASIC), software, firmware, or any kind of processing device, for performing one or more of the functions described herein as being performed by the SSD controller 108. In some embodiments, one or more of the functions described herein as being performed by the SSD controller 108 are instead performed by the host device 102. In some embodiments, some or all of the functions described herein as being performed by the SSD controller 108 may instead be performed by another element such as a controller in a hybrid drive including both non-volatile memory elements and magnetic storage elements.

The working memory 110 may be any memory, computing device, or system capable of storing data. For example, the working memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the SSD controller 108 uses the working memory 110, or a portion thereof, to store data during the transfer of data between the host device 102 and the NVM 112. For example, the working memory 110 or a portion of the working memory 110 may be a cache memory.

The host device 102 includes a module (e.g., hardware and/or software) for managing power states 114. In certain situations, the module for managing power states 114 may sent a request to change a power state 116 to the SSD 104. For example, the module for managing power states 114 may send a message over a PCI bus that configures a register (not shown) on the SSD 104 to indicate a particular device power state (e.g., D0, D1, D2, or D3).

The SSD 104 includes a module (e.g., hardware and/or software) for managing power states 118. Responsive to the change in the power state indicated by the register discussed above, the module for managing power states 118 may control one or more components of the SSD 104 to change the power consumption of the component(s). For example, if the register is set to indicate a D3 power state (lowest power state), the module for managing power states 118 may turn off (e.g., deactivate, power off, etc.) one or more processing cores, memory circuits, and/or phase locked-loops (PLLs).

PCI Power States

The PCI power management specification defines several device power (Dx) states: D0, D1, D2, D3hot, and D3cold. As described in Table 1 below, the D0 power state corresponds to full-power operation of a device, the D1 and D2 power states correspond to intermediate power consumption at a device, and the D3 power state corresponds to lowest power consumption at a device. The D3 power state is further divided into two separate and distinct substates, D3hot and D3cold. The lower power states may be used, for example, in conjunction with putting a device into a sleep state.

TABLE 1

| States | Description |
| --- | --- |
| $D0_{unitialized}$ | When a device comes out of a conventional reset or a functional level reset (FLR), it defaults to the $D0_{unitialized}$ state |
| $D0_{active}$ | Following the completion of the enumeration and configuration process (e.g., device discovery and address assignment), the device enters the $D0_{active}$ state, the fully operational state. In this state, one of: the Memory Space Enable bit, the I/O Space Enable bit, or the Bus Master Enable bit has been enabled |
| D1 | Optional |
| D2 | Optional |
| $D3_{hot}$ | $D3_{hot}$ is a low power state where the main device power is not removed. Upon exiting this state, the device could go to the D0 state (uninitialized or active state) |
| $D3_{cold}$ | $D3_{hot}$ is a state where the main device power is removed. Full reinitialization shall be performed upon exit from this state, e.g., to the $D0_{unitialized}$ state |

PCI Link States

The PCI power management specification also defines several link states: L0, L1, L2, and L3. These link states may relate to a power state of components communicating on a PCI Express (PCIe) link. Based on the link state, the device power consumption can vary. As described in Table 2 below, the L0 link state corresponds to the normal full-power operation of a device, the L1 link state corresponds to a low power state, e.g., with intermediate power savings, the L2 link state corresponds to a lower power state (e.g., lower power than the L1 and L0 link states), and the L3 link state corresponds to a full-off condition. In some aspects, the link states may correspond to the device power states discussed above. For example, the L0 link state may correspond to the D0 device power state, the L1 link state may correspond to the D1, D2, or D3hot device power state, and the L2 link state may correspond to the D3cold device power state. In some examples, devices in the D0 device power state can autonomously transition between the L0, L0s, and L1 link states.

TABLE 2

| States | Description |
| --- | --- |
| L0 | Normal, fully operational link state |
| $L0_S$ | Low power link state; Has the shortest exit latency back to the LO state; Entry controlled by hardware only |
| L1 | Low power link state; Can be triggered by: Active state power management (ASPM) Device power management (PM) when the device is going to the D1, D2, or D3hot state |
| L1.1 | In the L1.1 state, the link common mode voltages are maintained |
| L1.2 | In the L1.2 state, the link common mode voltages are not required to be maintained |
| L2 | Low power link state; The link is placed at the L2 state when the device is placed at the D3cold state |
| L3 | Full-off condition |

NVMe Power States

The non-volatile memory express (NVMe) architecture defines several active power states that may be used to manage the power of SSDs. In one example, six NVMe power states are defined: PS0, PS1, PS2, PS3, PS4, and PS5. In this example, PS0, PS1, and PS2 may be operational power states and PS3, PS4, and PS5 may be non-operational power states. A different number of NVMe power states may be used in other examples.

An operational power state may be used, for example, to throttle an SSD to a specific TDP (thermal design power) to manage platform thermals (e.g., device temperature) and total power draw. A non-operational power state may be used, for example, in portable SSDs to improve battery life. While the device is idle, the device can be at a near zero power state. In some examples, the NVMe architecture takes advantage of PCIe low power states to help achieve lower power consumption.

Table 3 illustrates a set of examples of device power consumption for different link power states and different NVMe power states. Different power consumption values may be applicable in other examples.

TABLE 3

| Link State | NVMe Power State | Average (30 second) Power (Watts) |
|---|---|---|
| L1.2 | PS5 | 0.0023 |
| | PS4 | 0.003 |
| | PS3 | 0.0053 |
| | PS2 | 0.2049 |
| | PS1 | 0.2059 |
| | PS0 | 0.2062 |
| L1 | PS5 | 0.0106 |
| | PS4 | 0.0109 |
| | PS3 | 0.0135 |
| | PS2 | 0.4673 |
| | PS1 | 0.4706 |
| | PS0 | 0.4719 |
| L0 | PS5 | 1.0982 |
| | PS4 | 1.1108 |
| | PS3 | 1.1157 |
| | PS2 | 1.0563 |
| | PS1 | 1.056 |
| | PS0 | 1.057 |
| L3hot (L1.2) | PS5 | 0.0027 |

Conventional Power State Management

As mentioned above, a host can change a power state of a PCI peripheral device such as data storage device (that includes a PCI interface) by setting bits in a register of the device. For example, a power management control/status register (PMCSR) may include two bits for indicating a device power state such as any of D0, D1, D2, or D3. Typically, D3hot is indicated by setting each of these two bits to a one (1). A host may further indicate a D3cold power state to the data storage device by issuing a shut down request via a power management event signal. In some examples, an interrupt is generated at the data storage device following a host write to the PMCSR. In this way, the data storage device can immediately determine that its power state is to be changed.

When a host sets the bits of a PMCSR of a data storage device (operating in an active state) to indicate D3, a D3hot transition will occur at the data storage device. If the host supports link state L1.2, when the data storage device receives the D3 hot request, the data storage device will go to its lowest non-operational power state. In the example of Table 3, this corresponds to the last entry in the table where the NVMe Power State is PS5 and the power consumption of the data storage device is approximately 3 milliwatts (mW) or less.

In contrast, if the host does not support link state L1.2 (e.g., the host may be a legacy host that only supports link state L1), the data storage device will remain in an operational power state and the link state will be taken to link state L1 as required by the PCI specification. In the example of Table 3, this corresponds to the NVMe power state PS0, PS1, or PS2 shown in bold lettering. In this example, the power consumption of the data storage device is approximately 470 mW. Thus, power consumption is much higher at the data storage device in D3hot scenarios where the host does not support link state L1.2.

Figure 2:
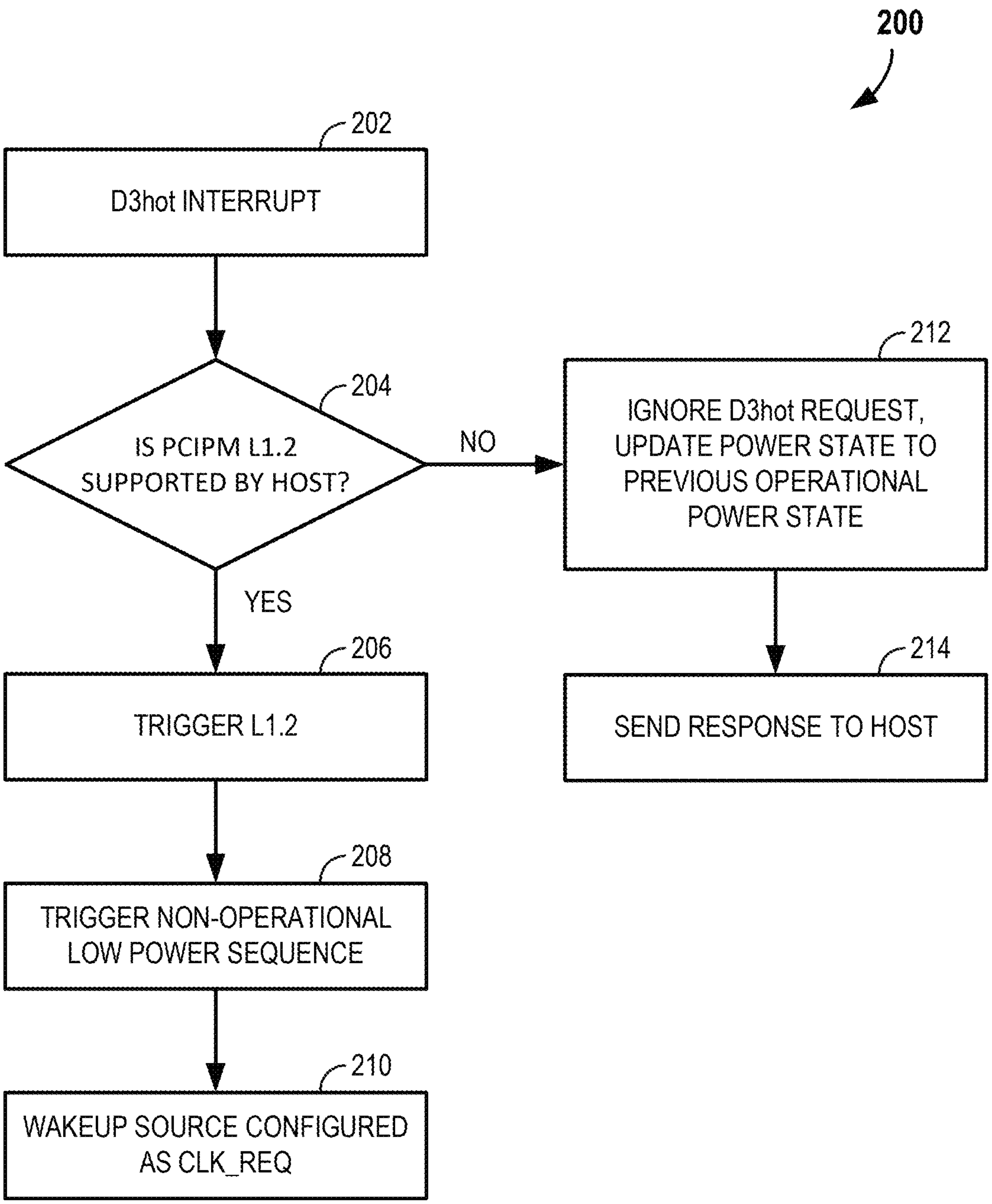
FIG. 2 illustrates an example of conventional power state management operations.

FIG. 2 illustrates an example of operations that may be performed at a data storage device (e.g., a PCI-based SSD) device in conjunction with conventional handling of a D3hot request from a host device. At #202, a D3hot interrupt occurs at the data storage device. At #204, the data storage device determines whether link state L1.2 is supported by the host. If so, at #206, the data storage device triggers a transition to link state L1.2. In addition, at #208, the data storage device triggers a non-operational low power sequence (e.g., a transition to a non-operational low power state). For example, the data storage device may set the NVMe power state to PS5 and turn off one or more components of the data storage device. At #210, the wakeup source for the data storage device will be configured to be CLK_REQ (e.g., the CLK_REQ signal) as required by the PCI specification.

CLK_REQ is a dedicated signal between a host and a particular device that is used, for example, to inform a device that is in device state D3cold to wakeup to receive commands from the host. CLK_REQ is configured as an open drain signal whereby the host and the device may independently drive (assert) the signal to the active low state. When a device is in a non-operational state, both the host and the device de-assert the CLK_REQ signal. Subsequently, when the host needs to send a command to the device, the host asserts (drives low) the CLK_REQ signal. This informs the device, for example, that it needs to transition to an operational state.

Figure 3:
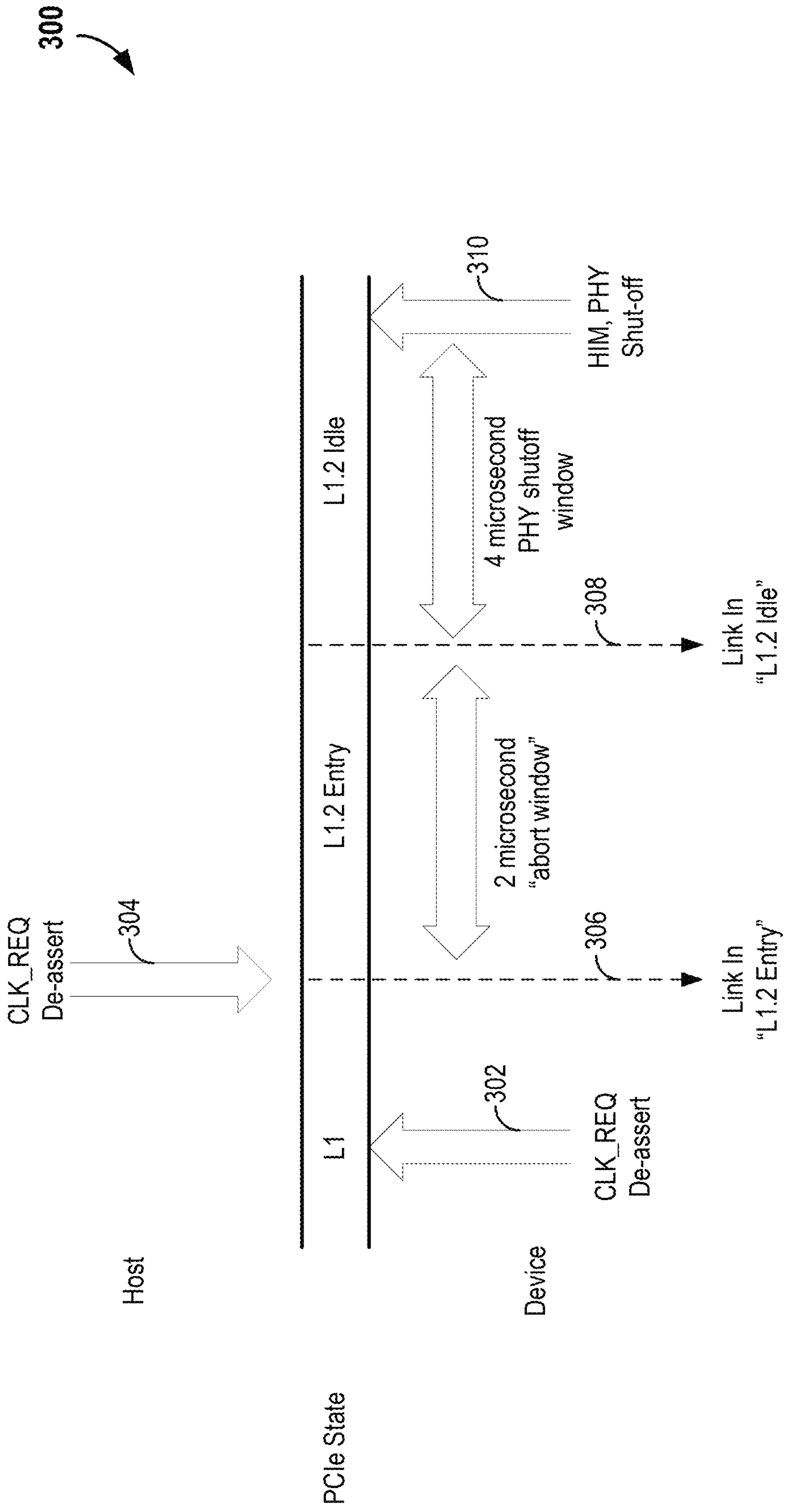
FIG. 3 illustrates an example of signal timing for the power state management operations of FIG. 2.

FIG. 3 illustrates an example of PCIe bus signaling that may be associated with some of the operations of FIG. 2. In some aspects, this figure illustrates that the CLK_REQ signal may be controlled by the host and/or by logic on the device side. Responsive to a D3hot request, a data storage device at link state L1 will stop driving the CLK_REQ to a low state. In other words, the data storage device will de-assert 302 the CLK_REQ signal. In addition, the host will stop driving (de-assert 304) the CLK_REQ. Consequently, the CLK_REQ signal will be at an inactive (de-asserted) high state as the link state for the data storage device transitions to L1.2 at 306. After a 2 microsecond abort window, the link state for the data storage device will be at L1.2 idle at 308. Following a 4 microsecond PCI physical interface (PHY) shutoff window, the data storage device may shut off components such as a host interface module (HIM) and the PCI PHY 310.

Referring again to FIG. 2, if the data storage device determines at #204 that the host does not support link state L1.2, the operational flow goes to #212 (instead of #206) whereby the data storage device ignores the D3hot request. In this case, the data storage device will remain at link state L1 and update its power state to the previous operational power state (e.g., PS0, PS1, or PS2). The data storage device then sends a response to the host indicating the current power state of the data storage device. As discussed above, power consumption is much higher at the data storage device in this scenario where the host does not support link state L1.2.

Example Power State Management

In view of the above issues with conventional power state management, the disclosure relates in some aspects to various techniques for managing power states in a scenario where a host does not support certain power states (e.g., link state L1.2). In some examples, upon receiving a D3hot request in a scenario whether the host does not support link state L1.2, a data storage device may nevertheless transition to link state L1.2 and a non-operational power mode (e.g., PS5). In some aspects, this action may be referred to as a pseudo (or fake) L1.2 mode.

Figure 4:
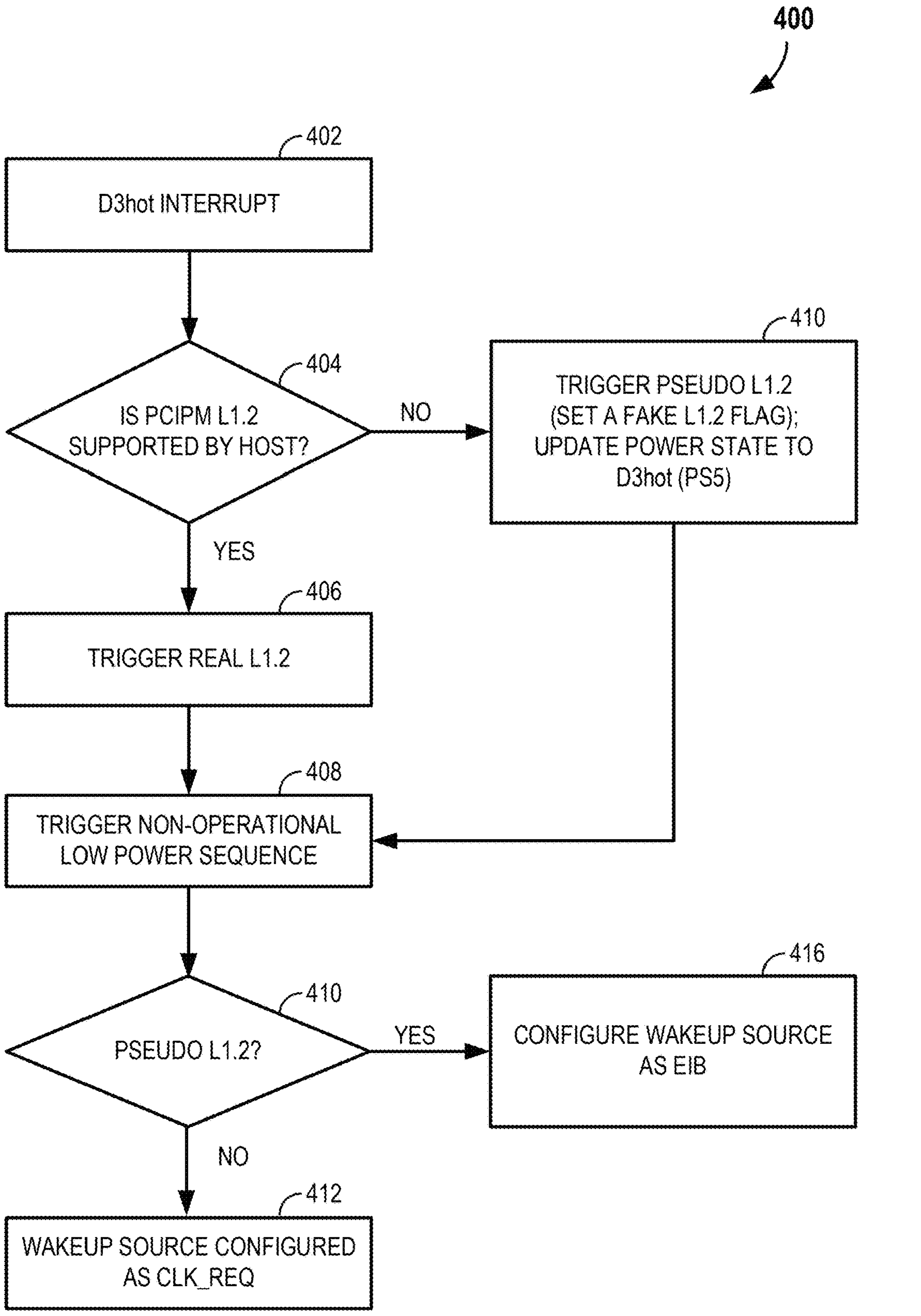
FIG. 4 illustrates an example of power state management operations in accordance with one or more aspects of the disclosure.

FIG. 4 illustrates an example of operations that may be performed at a data storage device (e.g., a PCI-based SSD) device in conjunction with handling of a D3hot request from a host device in accordance with the teachings herein. At #402, a D3hot interrupt occurs at the data storage device. At #404, the data storage device determines whether link state L1.2 is supported by the host. For example, the data storage device may read a host capability register on the data storage device that the host has configured to indicate whether the host supports link state L1.2.

If the host supports link state L1.2, then at #406, the data storage device triggers a transition to link state L1.2. In addition, at #408, the data storage device triggers a non-operational low power sequence (e.g., a transition to a non-operational low power state). For example, the data storage device may set the NVMe power state to PS5 and turn off (e.g., deactivate, power off, etc.) one or more components of the data storage device.

In contrast, if the data storage device determines at #404 that the host does not support link state L1.2, the operational flow goes to #410 (instead of #406) whereby the data storage device triggers a pseudo (fake) L1.2 mode. In this case, the data storage device may re-write the PMCSR to indicate link state L1.2. In addition, the data storage device may update its power state to D3hot. The operational flow then proceeds to #408 discussed above.

In some examples, the non-operational low power sequence of #408 may include idling one or more computing threads and/or processing cores. Here, control may be given to a power management (PM) module (e.g., a PM IC) to enable only a primary core and associated XRAM memory. Thus, any other cores and memories may be turned off, along with one or more PLLs.

Before transitioning to the non-operational power state, the data storage device may configure its wake up source to be an electrical idle broken (EIB) signal. In some examples, the use of the EIB signal as a wake up source involves the data storage device monitoring for (detecting) an electrical disturbance on the PCI bus (e.g., due to the host sending a command or some other signal) to determine when to wake-up from the low power mode. In some examples, a host interface module may perform EIB detection (e.g., by determining whether a PCI PHY of the data storage device has received a signal on a PCI bus signal path).

At #410, the data storage device determines whether the L1.2 mode is a real L1.2 mode or a pseudo (fake) L1.2 mode. If the L1.2 mode is a real L1.2 mode, at #412, the wakeup source for the data storage device will be CLK_REQ as required by the PCI specification.

However, if the L1.2 mode is a pseudo (fake) L1.2 mode, at #416, the data storage device will configure its wakeup source as EIB. Thus, rather than relying on CLK_REQ (which is unavailable since the host has not de-asserted CLK_REQ in this case), the data storage device will monitor for an electrical disturbance on the PCI bus (e.g., due to the host sending a command or some other signal) to determine when to wake-up from the low power mode.

Thus, whenever a data storage device determines that a host does not support PCIe power mode L1.2, the data storage device may invoke a pseudo (fake) L1.2 mode by moving the link to L1.2 mode from the data storage device side and configure EIB as the wakeup source. When EIB is configured as the wakeup source, a disturbance on the PCIe link may wake up the data storage device (e.g., a corresponding interrupt is generated) and move the link to L0 mode. For example, firmware on the data storage device may be configured in a polling mode whereby, in response to the interrupt, the firmware will start the wakeup process.

Figure 5:
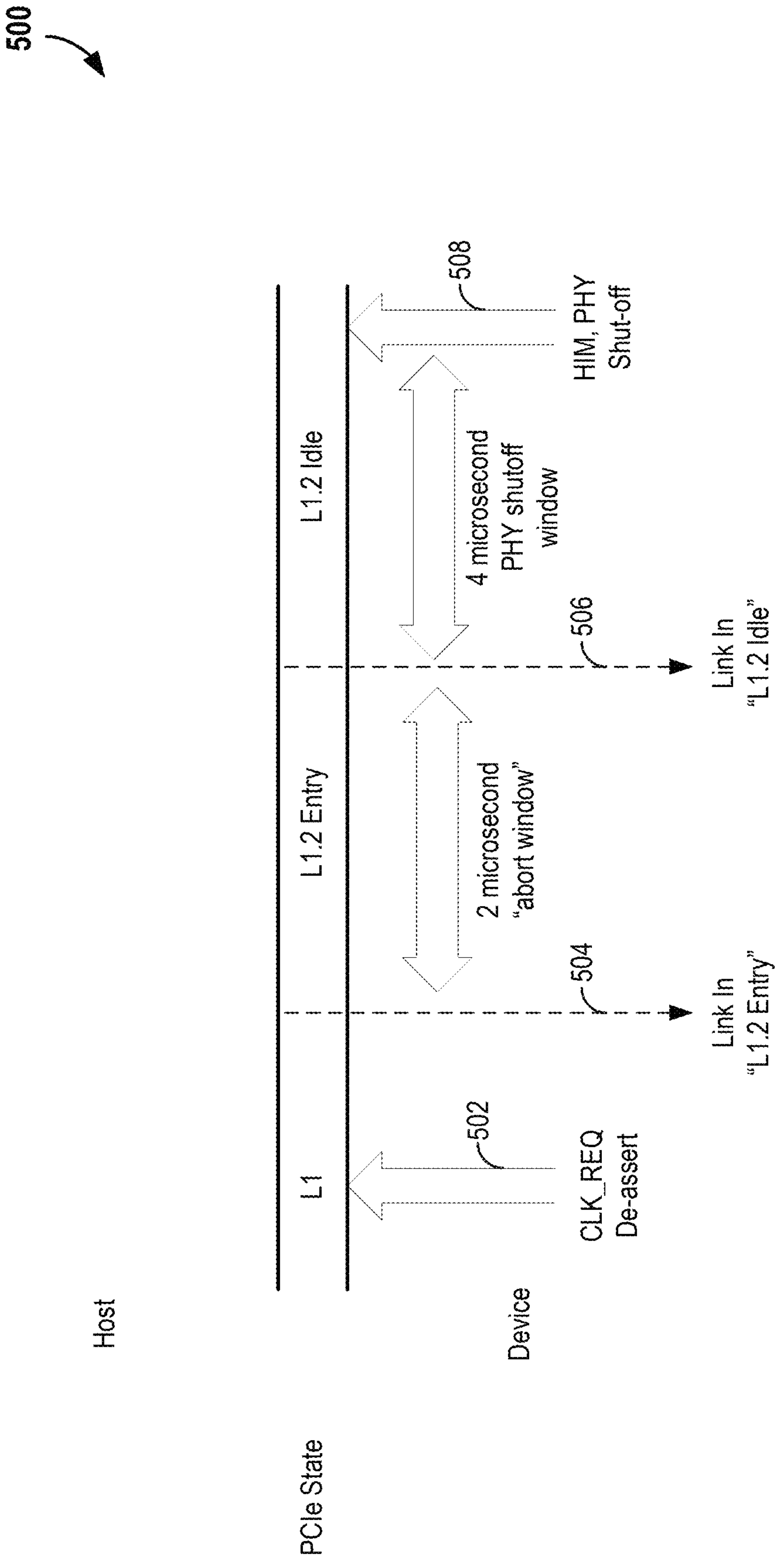
FIG. 5 illustrates an example of signal timing for the power state management operations of FIG. 4 in accordance with one or more aspects of the disclosure.

FIG. 5 illustrates an example of PCIe bus signaling that may be associated with some of the operations of FIG. 4. Responsive to a D3hot request, a data storage device at link state L1 will de-assert 502 CLK_REQ. In contrast with FIG. 3, however, the host does not de-assert CLK_REQ in this case because the host is not expecting a transition at 504 to link state L1.2 (e.g., the host assumes the link state is L1) and, according to the PCI specification, CLK_REQ is only used for link state L1.2. After a 2 microsecond abort window, the link state for the data storage device will be at L1.2 idle at 506. Following a 4 microsecond PHY shutoff window, the data storage device may shut off components such as one or more of a host interface module (HIM), a PCI physical interface (PHY) 508, processing cores, memories, PLLs, or other SSD components.

In the example of FIG. 4, power consumption may be much lower at the data storage device when the host does not support link state L1.2 as compared to the example of FIG. 2. For example, the power consumption of the data storage device may be approximately 11 mW in the pseudo (fake) L1.2 mode (D3hot, L1.2, and PS5) in some examples. The pseudo (fake) L1.2 mode may require more power as compared to a real L1.2 mode due to, for example, the use of EIB monitoring.

Here, since the power consumption of the data storage device is lower, the battery life of the overall computing system (e.g., a laptop) may be longer. In addition, since the power consumption of the data storage device is lower, the temperature of the electronic components (e.g., an ASIC and NAND devices) will be lower, which may increase performance and/or component life.

In view of the above, in a first aspect, the disclosure relates to setting a first power state (e.g., an NVMe power state) of the data storage device to a non-operational power state (e.g., PS5) as a result of the receipt of a D3hot request and a determination that the host device does not support the L1.2 link state.

In a second aspect, the disclosure relates to entering the PCIe D3hot power state as a result of receiving a D3hot request and determining that the host device does not support the L1.2 link state.

In a third aspect, the disclosure relates to setting a power management control and status register (PMCSR) to indicate the L1.2 link state as a result of receiving a D3hot request and determining that the host device does not support the L1.2 link state.

In a fourth aspect, the disclosure relates to configuring a wake-up circuit for electrical idle broken (EIB) signal detection as a result of receiving a D3hot request and determining that the host device does not support the L1.2 link state.

In a fifth aspect, the disclosure relates to monitoring for an electrical idle broken (EIB) signal as a result of receiving a D3hot request and determining that the host device does not support the L1.2 link state.

In a sixth aspect, the disclosure relates to setting the first power state of the data storage device to an operational power state as a result of detecting of an EIB signal.

In a seventh aspect, the disclosure relates to setting an NVMe power state of the data storage device to an operational power state as a result of detecting of an EIB signal.

In an eighth aspect, the disclosure relates to entering a PCI D0 power state as a result of detecting of an EIB signal.

In a ninth aspect, the disclosure relates to configuring at least one component of the data storage device to transition from a first power state to a second power state that is associated with lower power consumption than the first power state as a result of receiving a D3hot request and determining that the host device does not support the L1.2 link state.

In a tenth aspect, the disclosure relates to configuring the at least one component to transition from the second power state to the first power state as a result of detecting of an EIB signal.

In an eleventh aspect, the disclosure relates to turning off at least one of a processing core, a memory circuit, or a phase-locked loop (PLL) as a result of receiving a D3hot request and determining that the host device does not support the L1.2 link state.

In a twelfth aspect, the disclosure relates to turning on (e.g., activating, powering on, etc.) the at least one of the processing core, the memory circuit, or the PLL as a result of detecting of an EIB signal.

These aspects and other aspects of the disclosure will now be described in more detail in conjunction with FIGS. 6-12.

Example Components of a Data Storage Device

Figure 6:
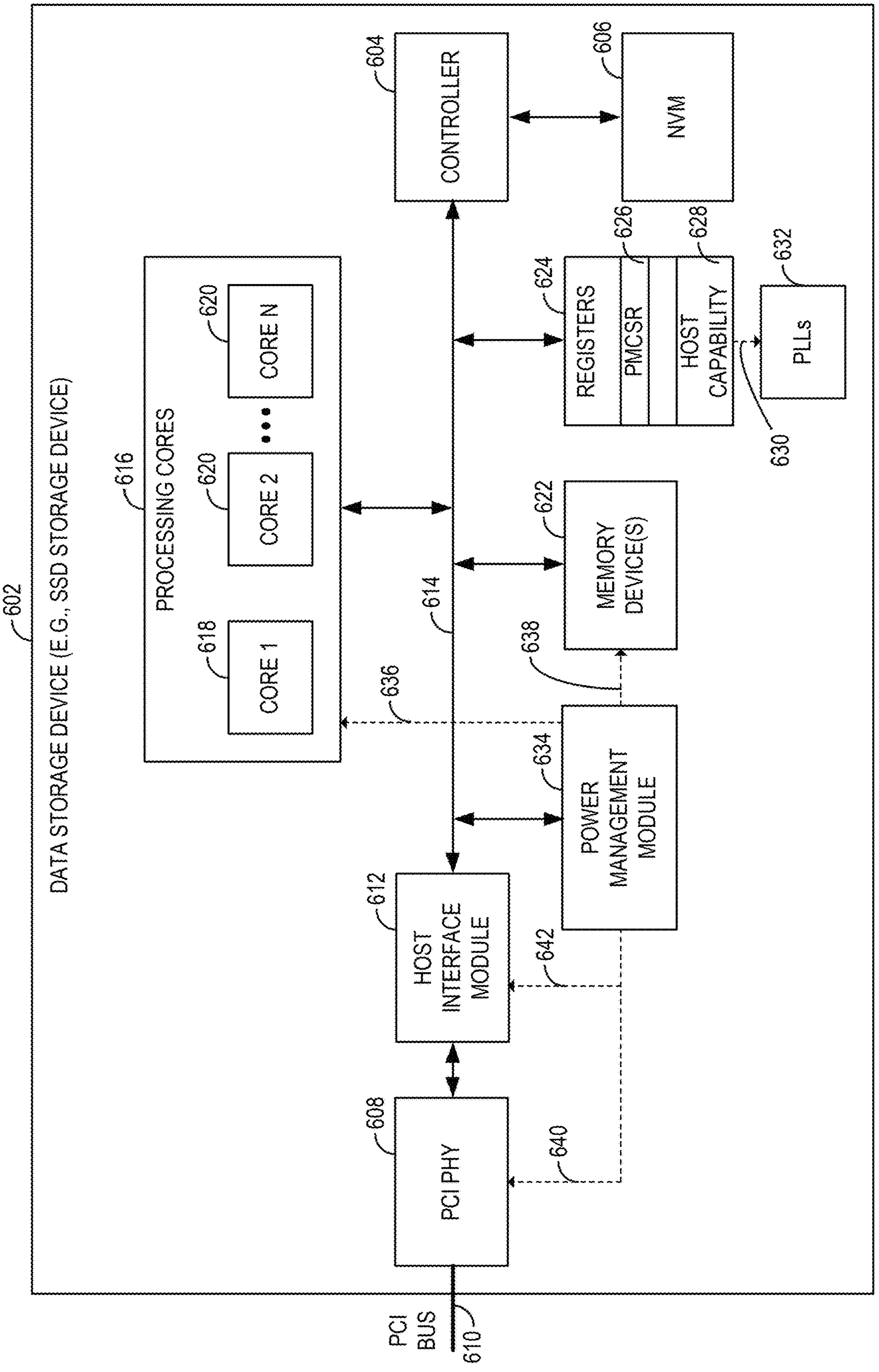
FIG. 6 illustrates an example hardware implementation for a data storage device (e.g., an SSD) that includes various components for supporting power state management in accordance with one or more aspects of the disclosure.

FIG. 6 illustrates an embodiment of a data storage device 602 that may support power state management as taught herein. The data storage device 602 includes a controller 604 that writes data to and reads data from an NVM 606, and performs other associated data storage operations (e.g., as discussed herein).

The data storage device 602 includes a PCI physical interface (PCI PHY) 608 for communication with other devices over a PCI bus 610. The PCI bus may be a legacy PCI bus, a PCI Express (PCIe) bus, or some other form of PCI bus (e.g., as defined by future standards).

The data storage device 602 includes a host interface module (HIM) 612 for communication with a host device (not shown) via the PCI PHY 608. In some examples, the HIM 612 may process commands (e.g., data writes/reads, register writes/reads, etc.) from the host device and take action accordingly (e.g., forwarding data commands to the controller 604, forwarding read data to the host device, writing to registers, etc.).

In the example of FIG. 6, a bus 614 is used to enable inter-component communication between various components of the data storage device 602. Such inter-component communication may be implemented in other ways in different examples (e.g., some components may communicate over a dedicated bus).

The data storage device 602 includes several processing cores 616. The processing cores 616 may include a primary processing core 618 and one or more secondary processing cores 620. In some examples, different memory circuits (not shown) may be associated with each processing core. In some examples, some or all of the processing cores 616 may be implemented within the controller 604, within an ASIC (not shown in FIG. 6), or within an ASIC that includes the controller 604.

The data storage device 602 includes one or more memory devices 622. The memory device(s) 622 may be used by various components (e.g., the HIM 612, the controller 604, the processing cores 616, etc.) of the data storage device 602 for storing volatile data and/or non-volatile data. In some examples, some or all of the memory device(s) 622 may be implemented within the controller 604, within an ASIC (not shown in FIG. 6), or within an ASIC that includes the controller 604.

The data storage device 602 includes several registers 624 that may be accessed by various components of the data storage device 602. For example, the registers 624 may include a PMCSR 626 and/or a host capability register 628 as discussed herein. In some examples, the registers 624 may include special function registers (e.g., implemented in an ASIC) that are used to control (e.g., via I/O signaling 630) one or more components (e.g., PLLs 632, etc.) of the data storage device 602. In some examples, some or all of the registers 624 and/or the PLLs 632 may be implemented within the controller 604, within an ASIC (not shown in FIG. 6), or within an ASIC that includes the controller 604.

The data storage device 602 includes a power management (PM) module (e.g., a PM IC) 634 that is used, for example, to control the power states of the data storage device 602. In some examples, some or all of the functionality of the power management module 634 may be implemented within the controller 604, within an ASIC (not shown in FIG. 6), or within an ASIC that includes the controller 604.

In some examples, the power management module 634 may take action responsive to a change in the Dx bits of the PMCSR. For example, in response to an interrupt associated with a D3hot request, the power management module 634 may take one or more of the following actions.

In some examples, the power management module 634 may send a message or signal 636 that instructs one or more of the processing cores 616 (e.g., processing cores 620) or some other component to suspend any pending activities (e.g., program threads) and prepare for shut down. Here, one or more of the processing cores 616 (e.g., processing core 618) may remain operational (i.e., is not shut down) so that at least one core is available to bring the data storage device 602 out of a non-operational state and/or perform any other critical functions.

In some examples, the power management module 634 may send a message or signal 638 that shuts down or suspends one or more of the memory device(s) 622. In some examples, the power management module 634 may set a bit in one of the registers 624 that controls an I/O signal that will shut down or suspend one or more of the memory device(s) 622.

In some examples, the power management module 634 may send a message or signal that shuts down or suspends one or more of the PLLs 632. In some examples, the power management module 634 may set a bit in one of the registers 624 that controls an I/O signal that will shut down or suspend one or more of the PLLs 632.

In some examples, the power management module 634 may send a message or signal 640 that shuts down or suspends one or more of the components (e.g., a transmit chain, a PCI link, etc.) of the PCI PHY 608. In some examples, the power management module 634 may set a bit in one of the registers 624 that controls an I/O signal that will shut down or suspend one or more of the components of the PCI PHY 608.

In some examples, the power management module 634 may send a message or signal 642 that shuts down or suspends one or more of the components (e.g., message processing, etc.) of the HIM 612. In some examples, the power management module 634 may set a bit in one of the registers 624 that controls an I/O signal that will shut down or suspend one or more of the components of the HIM 612.

In some examples, the power management module 634 may send a message or signal that shuts down or suspends one or more SSD components (e.g., the controller 604). In some examples, the power management module 634 may set a bit in one of the registers 624 that controls an I/O signal that will shut down or suspend one or more of the SSD components.

The operations described above may be performed by different components in different examples. Also, in some examples, one or more of these operations may be performed by one processor and other operations may be performed by at least one other processor. In some examples, the operations described above may be performed by a common device (e.g., an ASIC, a CPU, etc.). Other means of implementing these functions are possible consistent with the teachings herein.

Example SSD

Figure 7:
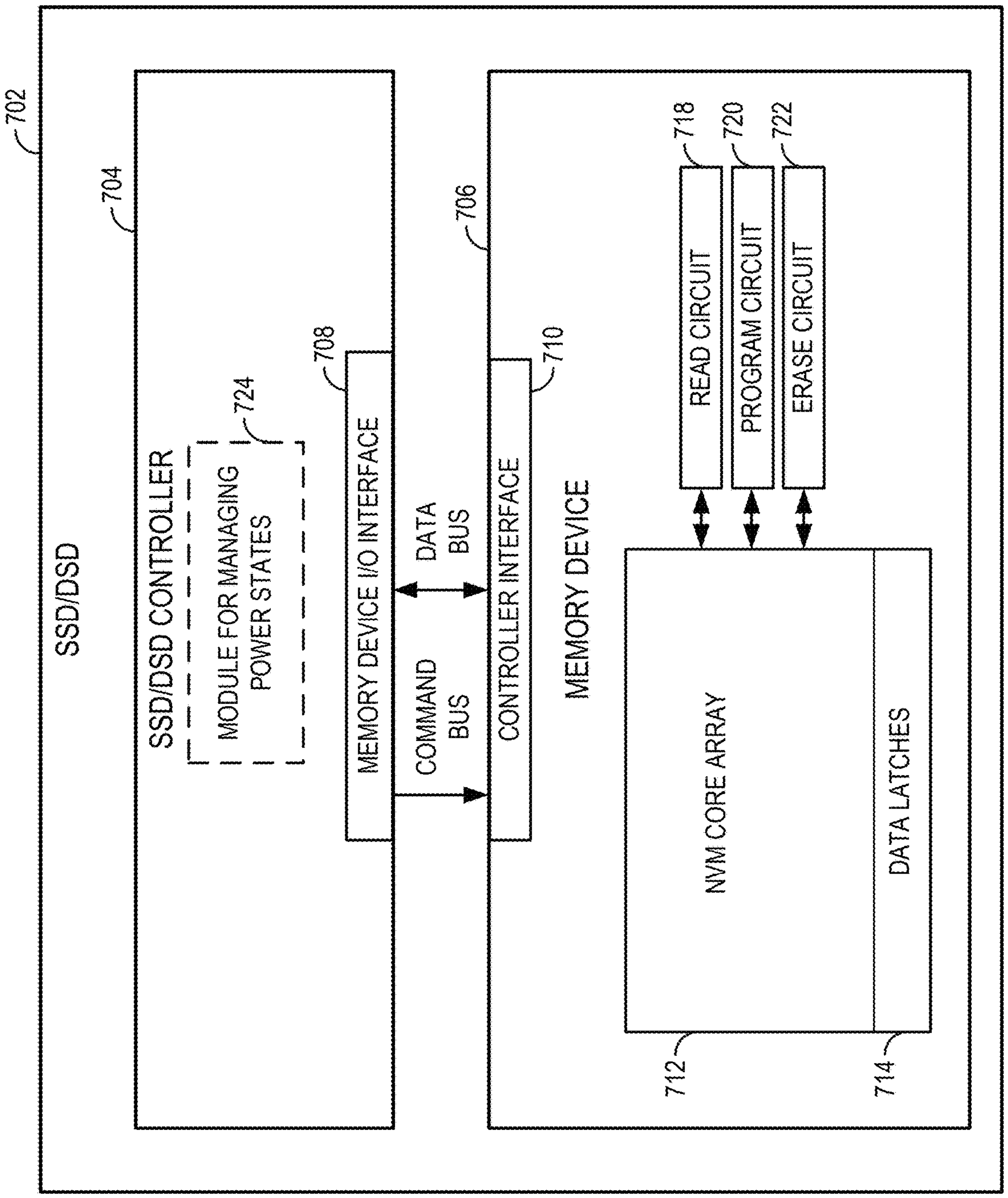
FIG. 7 illustrates an example SSD that supports power state management in accordance with one or more aspects of the disclosure.

FIG. 7 illustrates an embodiment of an SSD/DSD 702 that may support power state management as taught herein. The SSD/DSD 702 includes an SSD/DSD controller 704 that writes data to and reads data from a memory device 706 (e.g., an NVM), and performs other associated data storage operations. For brevity, the SSD/DSD 702 and the SSD/DSD controller 704 may be referred to herein as the SSD 702 and the SSD controller 704, respectively.

The SSD controller 704 and the memory device 706 communicate with one another via corresponding interfaces. The SSD controller 704 includes a memory device input/output (I/O) interface 708 for sending commands to the memory device (e.g., via a command bus), sending data to and receiving data from the memory device 706 (e.g., via a data bus), and for sending and receiving other signaling as applicable (e.g., a read/busy indication (RBx) generated by the memory device 706). Similarly, the memory device 706 includes a controller interface 710 for receiving commands from the SSD controller 704 (e.g., via a command bus), sending data to and receiving data from the SSD controller 704 (e.g., via a data bus), and for sending and receiving other signaling as applicable (e.g., RBx).

The memory device 706 includes an NVM core array 712 for storing data, data latches 714 for outputting stored data to and receiving data to be stored from the controller interface 710, and for storing operational data that is used by the memory device 706. The memory device 706 also includes a read circuit 718 for reading data from the multi-tier NVM core array 712, a program circuit 720 for writing data to the multi-tier NVM core array 712, and an erase circuit 722 for erasing data in the multi-tier NVM core array 712.

In accordance with the teachings herein, the SSD controller 704 may include a module for managing power states 724 that may be configured to perform one or more of the operations described herein. For example, the module for managing power states 724 may implement functionality to receive a message or signal indicating that one or more of the components or operations of the SSD is to be shut down or suspended. Upon receiving such a message or signal, the module for managing power states 724 may take the requested action (e.g., suspend a read or write operation, shut down one or more PLLs, turn off one or more memory circuits (e.g., volatile memory), etc.).

Example Data Storage Device

Figure 8:
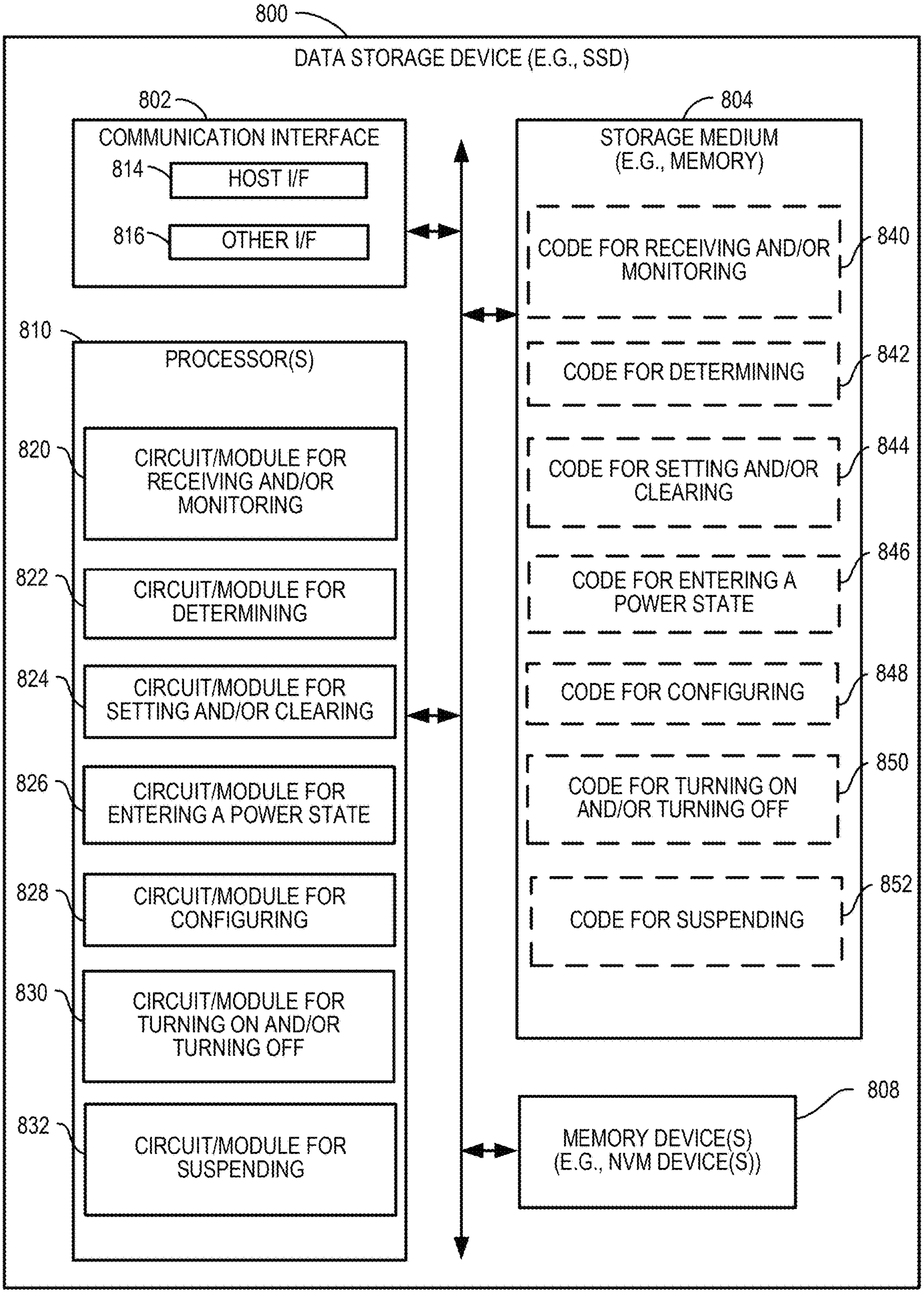
FIG. 8 illustrates an example hardware implementation for a data storage device (e.g., an SSD) that supports power state management in accordance with one or more aspects of the disclosure.

FIG. 8 illustrates an embodiment of a data storage device 800 configured to communicate according to one or more aspects of the disclosure. The data storage device 800 could embody or be implemented within an SSD, a memory controller, a solid state drive, a host device, an NVM device, a NAND die, or some other type of device that supports data storage. In various implementations, the data storage device 800 could embody or be implemented within a computing device, a personal computer, a laptop, a portable device, or workstation, a server, a personal digital assistant, a digital camera, a digital phone, an entertainment device, a medical device, or any other electronic device that stores data.

The data storage device 800 includes a communication interface 802, a storage medium 804, at least one memory device (e.g., an NVM device) 808, and at least one processor 810 (e.g., at least one processor and/or other suitable circuitry). These components can be coupled to and/or placed in electrical communication with one another via a signaling bus or other suitable component, represented generally by the connection lines in FIG. 8. The signaling bus may include any number of interconnecting buses and bridges depending on the specific application of the at least one processor 810 and the overall design constraints. The signaling bus links together various circuits such that each of the communication interface 802, the storage medium 804, and the memory device(s) 808 are coupled to and/or in electrical communication with the at least one processor 810. The signaling bus may also link various other circuits (not shown) such as timing sources, peripherals, voltage regulators, and power management circuits, which are well known in the art, and therefore, will not be described any further.

The communication interface 802 provides a means for communicating with other apparatuses over a transmission medium. In some implementations, the communication interface 802 includes circuitry and/or programming (e.g., a program) adapted to facilitate the communication of information bi-directionally with respect to one or more devices in a system. In some implementations, the communication interface 802 may be configured for wire-based communication. For example, the communication interface 802 could be a bus interface, a send/receive interface, or some other type of signal interface including drivers, buffers, or other circuitry for outputting and/or obtaining signals (e.g., outputting signal from and/or receiving signals into an integrated circuit). The communication interface 802 serves as one example of a means for receiving and/or a means for transmitting. In some implementations, the communication interface 802 may be configured for wireless communication. In some implementations, the communication interface includes a host interface 814 (e.g., a PCI-based interface). In some implementations, the communication interface may include at least one other interface 816. For example, the communication interface 802 may include at least one radio frequency (RF) receiver and/or RF transmitter (e.g., collectively an RF transceiver).

The memory device(s) 808 may represent one or more memory devices. As indicated, the memory device(s) 808 may maintain power state information along with other information used by the data storage device 800. In some implementations, the memory device(s) 808 and the storage medium 804 are implemented as a common memory component. The memory device(s) 808 may also be used for storing data that is manipulated by the at least one processor 810 or some other component of the data storage device 800.

The storage medium 804 may represent one or more computer-readable, machine-readable, and/or processor-readable devices for storing programming, such as processor executable code or instructions (e.g., software, firmware), electronic data, databases, or other digital information. The storage medium 804 may also be used for storing data that is manipulated by the at least one processor 810 when executing programming. The storage medium 804 may be any available media that can be accessed by a general purpose or special purpose processor, including portable or fixed storage devices, optical storage devices, and various other mediums capable of storing, containing or carrying programming.

By way of example and not limitation, the storage medium 804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 804 may be embodied in an article of manufacture (e.g., a computer program product). By way of example, a computer program product may include a computer-readable medium in packaging materials. In view of the above, in some implementations, the storage medium 804 may be a non-transitory (e.g., tangible) storage medium. For example, the storage medium 804 may be a non-transitory computer-readable medium storing computer-executable code, including code to perform operations as described herein.

The storage medium 804 may be coupled to the at least one processor 810 such that the at least one processor 810 can read information from, and write information to, the storage medium 804. That is, the storage medium 804 can be coupled to the at least one processor 810 so that the storage medium 804 is at least accessible by the at least one processor 810, including examples where at least one storage medium is integral to the at least one processor 810 and/or examples where at least one storage medium is separate from the at least one processor 810 (e.g., resident in the data storage device 800, external to the data storage device 800, distributed across multiple entities, etc.).

Programming stored by the storage medium 804, when executed by the at least one processor 810, causes the at least one processor 810 to perform one or more of the various functions and/or process operations described herein. For example, the storage medium 804 may include operations configured for regulating operations at one or more hardware blocks of the at least one processor 810, as well as to utilize the communication interface 802 for wireless communication utilizing their respective communication protocols.

The at least one processor 810 is generally adapted for processing, including the execution of such programming stored on the storage medium 804. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The at least one processor 810 is arranged to obtain, process and/or send data, control data access and storage, issue commands, and control other desired operations. The at least one processor 810 may include circuitry configured to implement desired programming provided by appropriate media in at least one example. For example, the at least one processor 810 may be implemented as one or more processors, one or more controllers, and/or other structure configured to execute executable programming. Examples of the at least one processor 810 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The at least one processor 810 may also be implemented as a combination of computing components, such as a combination of a controller and a microprocessor, a number of microprocessors, one or more microprocessors in conjunction with an ASIC and a microprocessor, or any other number of varying configurations. These examples of the at least one processor 810 are for illustration and other suitable configurations within the scope of the disclosure are also contemplated.

According to one or more aspects of the disclosure, the at least one processor 810 may be adapted to perform any or all of the features, processes, functions, operations and/or routines for any or all of the apparatuses described herein. For example, the at least one processor 810 may be configured to perform any of the steps, functions, and/or processes described with respect to FIGS. 1-7 and 9-12. As used herein, the term "adapted" in relation to the at least one processor 810 may refer to the at least one processor 810 being one or more of configured, employed, implemented, and/or programmed to perform a particular process, function, operation and/or routine according to various features described herein.

The at least one processor 810 may be a specialized processor, such as an application-specific integrated circuit (ASIC) that serves as a means for (e.g., structure for) carrying out any one of the operations described in conjunction with FIGS. 1-7 and 9-12. The at least one processor 810 serves as one example of a means for sending and/or a means for receiving. In various implementations, the at least one processor 810 may provide and/or incorporate, at least in part, the functionality described above for the SSD controller 108 or the SSD 104 of FIG. 1, or the SSD controller 704 or the SSD 702 of FIG. 7.

According to at least one example of the data storage device 800, the at least one processor 810 may include one or more of a circuit/module for receiving and/or monitoring 820 (e.g., receiving a request, monitoring for an EIB signal, etc.), a circuit/module for determining 822 (e.g., determining whether a host device supports a particular power state), a circuit/module for setting and/or clearing 824 (e.g., setting a power state, setting a register, setting a bit, clearing a bit, etc.), a circuit/module for entering a power state 826, a circuit/module for configuring 828 (e.g., configuring a wake-up circuit, configuring a component, etc.), a circuit/module for turning on and/or turning off 830 (e.g., turning off a processing core, a memory circuit, or a PLL, turning on a processing core, a memory circuit, or a PLL, etc.), or a circuit/module for suspending 832 (e.g., suspending a processing thread). In various implementations, the circuit/module for receiving and/or monitoring 820, the circuit/module for determining 822, the circuit/module for setting and/or clearing 824, the circuit/module for entering a power state 826, the circuit/module for configuring 828, the circuit/module for turning on and/or turning off 830, or the circuit/module for suspending 832 may provide and/or incorporate, at least in part, the functionality described above for the SSD controller 108 or the SSD 104 of FIG. 1 or the SSD controller 704 or the SSD 702 of FIG. 7.

As mentioned above, a program stored by the storage medium 804, when executed by the at least one processor 810, causes the at least one processor 810 to perform one or more of the various functions and/or process operations described herein. For example, the program may cause the at least one processor 810 to perform the various functions, steps, and/or processes described herein with respect to FIGS. 1-7 and 9-12 in various implementations. As shown in FIG. 8, the storage medium 804 may include one or more of code for receiving and/or monitoring 840, code for determining 842, code for setting and/or clearing 844, code for entering a power state 846, code for configuring 848, code for turning on and/or turning off 850, or code for suspending 852. In various implementations, the code for receiving and/or monitoring 840, the code for determining 842, the code for setting and/or clearing 844, the code for entering a power state 846, code for configuring 848, the code for turning on and/or turning off 850, or the code for suspending 852 may be executed or otherwise used to provide the functionality described herein for the circuit/module for receiving and/or monitoring 820, the circuit/module for determining 822, the circuit/module for setting and/or clearing 824, the circuit/module for entering a power state 826, the circuit/module for configuring 828, the circuit/module for turning on and/or turning off 830, or the circuit/module for suspending 832.

First Example Process

Figure 9:
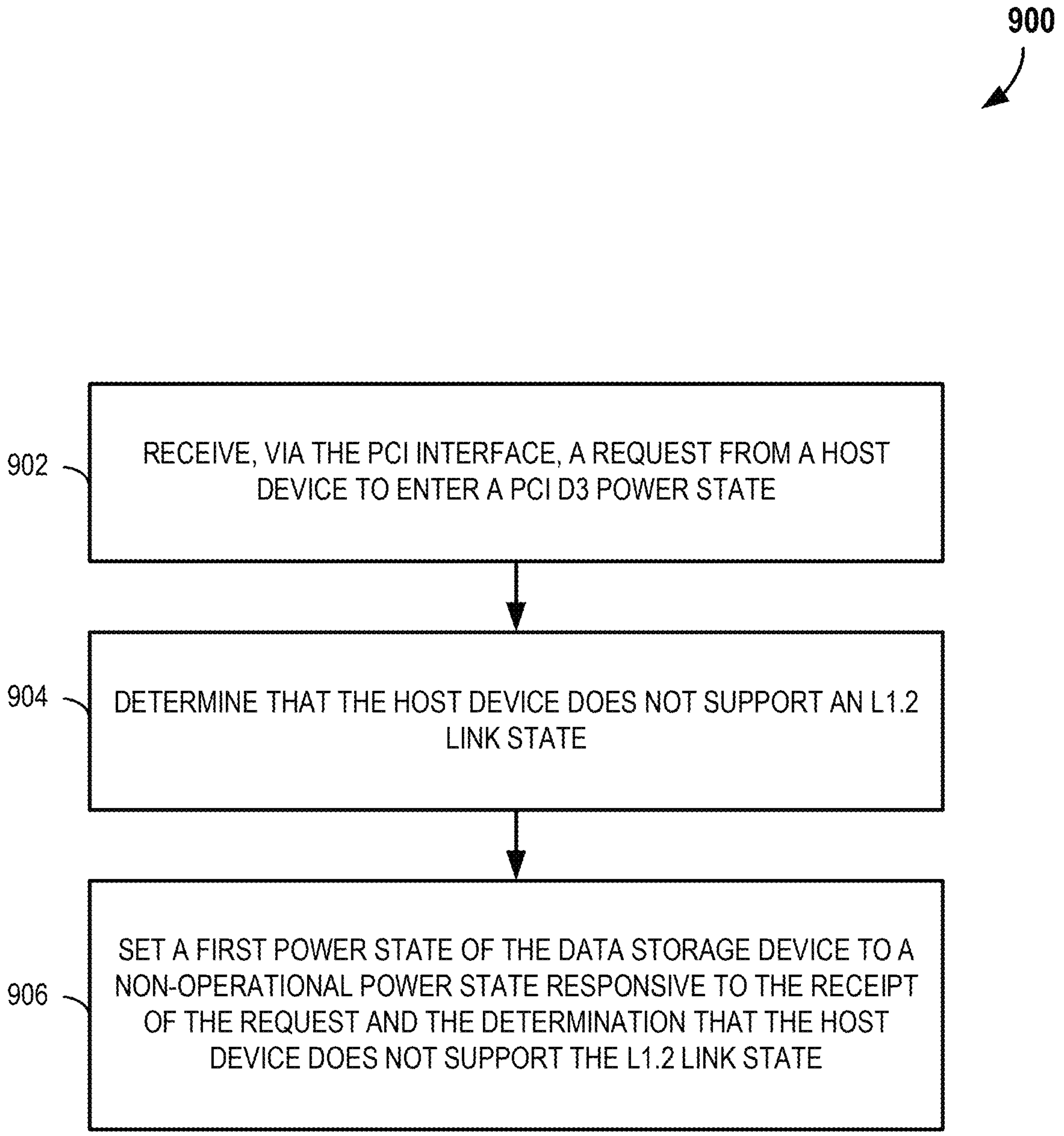
FIG. 9 illustrates an example of power state management operations in accordance with one or more aspects of the disclosure.

FIG. 9 illustrates a process 900 for communication in accordance with some aspects of the disclosure. The process 900 may take place within at least one processor (e.g., the processor(s) 810 of FIG. 8), which may be located in an ASIC, a controller, an SSD, an NVM device, a NAND die, or some other suitable apparatus. Of course, in various aspects within the scope of the disclosure, the process 900 may be implemented by any suitable apparatus capable of supporting memory-related operations.

At block 902, a data storage device may receive, via a PCI interface, a request from a host device to enter a PCI D3 power state. For example, the data storage device may receive a message (e.g., a configuration write) that configures a PMCSR register. In some examples, the PCI D3 power state is a PCI express (PCIe) D3hot power state.

At block 904, the data storage device may determine that the host device does not support an L1.2 link state. For example, the data storage device may read a host capability register to determine that the host device does not support an L1.2 link state.

At block 906, the data storage device may set a first power state of the data storage device to a non-operational power state responsive to the receipt of the request and the determination that the host device does not support the L1.2 link state. In some examples, the first power state is a non-volatile memory express (NVMe) power state. In some examples, the non-operational power state is an NVMe PS5 power state.

In some examples, the at least one processor includes a power management module configured to power off the at least one of a processing core, a memory circuit, or a phase-locked loop (PLL) responsive to the receipt of the request and the determination that the host device does not support the L1.2 link state.

In some aspects, a process in accordance with the teachings herein may include any combination of the above operations.

Second Example Process

Figure 10:
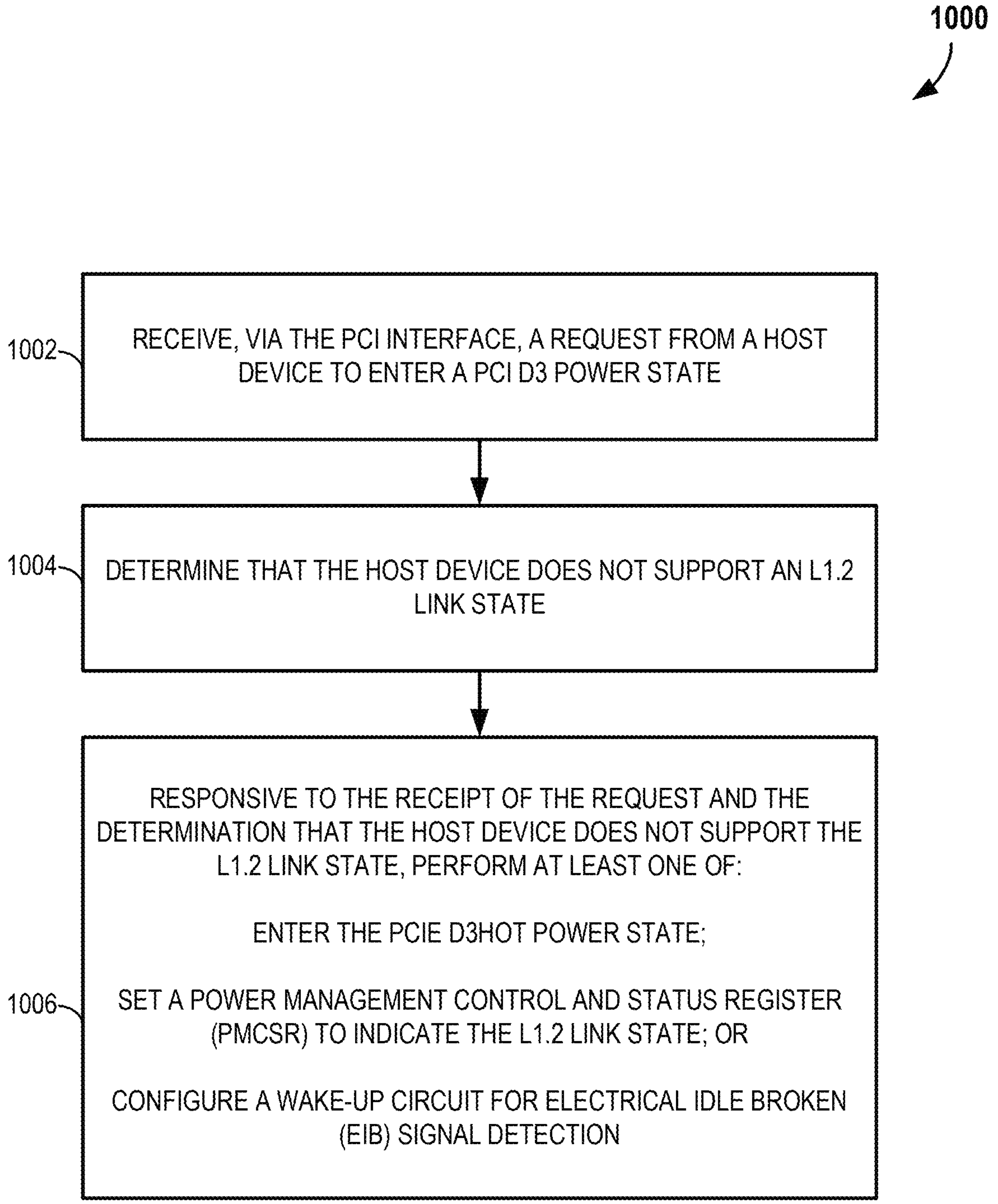
FIG. 10 illustrates another example of power state management operations in accordance with one or more aspects of the disclosure.

FIG. 10 illustrates a process 1000 for communication in accordance with some aspects of the disclosure. In some examples, the operations of the process 1000 may be performed in conjunction with (e.g., in addition to and/or as part of) the operations of the process 900 of FIG. 9. The process 1000 may take place within at least one processor (e.g., the processor(s) 810 of FIG. 8), which may be located in an ASIC, an SSD, a controller, an NVM device, a NAND die, or some other suitable data storage device. Of course, in various aspects within the scope of the disclosure, the process 1000 may be implemented by any suitable data storage device capable of supporting memory-related operations.

At block 1002, a data storage device may receive, via a PCI interface, a request from a host device to enter a PCI D3 power state. In some aspects, the operations of block 1002 may correspond to the operations of block 902 of FIG. 9.

At block 1004, the data storage device may determine that the host device does not support an L1.2 link state. In some aspects, the operations of block 1004 may correspond to the operations of block 904 of FIG. 9.

At block 1006, responsive to the receipt of the request and the determination that the host device does not support the L1.2 link state, the data storage device may perform at least one of: enter the PCIe D3hot power state, set a power management control and status register (PMCSR) to indicate the L1.2 link state, or configure a wake-up circuit for electrical idle broken (EIB) signal detection. In some examples, the at least one processor includes a host interface module that includes the wake-up circuit.

In some aspects, a process in accordance with the teachings herein may include any combination of the above operations.

Third Example Process

FIG. 11 illustrates a process 1100 for communication in accordance with some aspects of the disclosure. In some examples, the operations of the process 1100 may be performed in conjunction with (e.g., in addition to and/or as part of) the operations of the process 900 of FIG. 9. The process 1100 may take place within at least one processor (e.g., the processor(s) 810 of FIG. 8), which may be located in an ASIC, a controller, an SSD, or some other suitable data storage device. Of course, in various aspects within the scope of the disclosure, the process 1100 may be implemented by any suitable data storage device capable of supporting memory-related operations.

At optional block 1102, a data storage device may receive, via a PCI interface, a request from a host device to enter a PCI D3 power state. In some aspects, the operations of block 1102 may correspond to the operations of block 902 of FIG. 9.

At block 1104, the data storage device may determine that the host device does not support an L1.2 link state. In some aspects, the operations of block 1104 may correspond to the operations of block 904 of FIG. 9.

At block 1106, responsive to the receipt of the request and the determination that the host device does not support the L1.2 link state, the data storage device may perform at least one of: suspend at least one data storage thread (e.g., suspend a processing thread associated with a data operation), configure at least one component of the data storage device to transition from a first power state to a second power state that is associated with lower power consumption than the first power state (e.g., set or clear at least one bit in at least one register that controls the at least one component), or power off at least one of a processing core, a memory circuit, or a phase-locked loop (PLL) (e.g., set or clear at least one bit in at least one register that controls the at least one of the processing core, the memory circuit, or the PLL).

In some aspects, a process in accordance with the teachings herein may include any combination of the above operations.

Fourth Example Process

Figure 12:
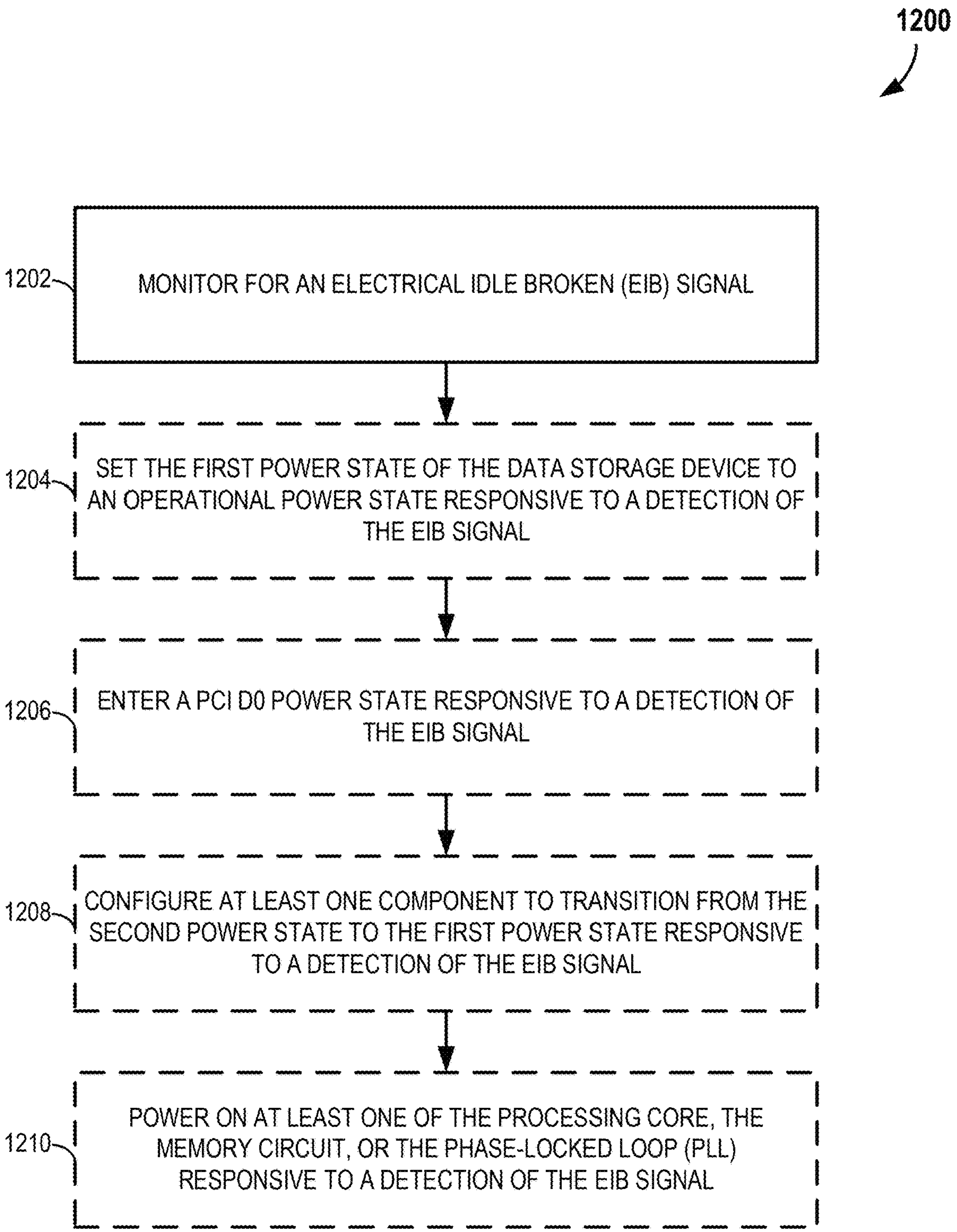
FIG. 12 illustrates another example of power state management operations in accordance with one or more aspects of the disclosure.

FIG. 12 illustrates a process 1200 for communication in accordance with some aspects of the disclosure. In some examples, the operations of the process 1100 may be performed in conjunction with (e.g., in addition to and/or as part of) the operations of the process 900 of FIG. 9. The process 1200 may take place within at least one processor (e.g., the processor(s) 810 of FIG. 8), which may be located in an ASIC, a controller, an SSD, or some other suitable data storage device. Of course, in various aspects within the scope of the disclosure, the process 1200 may be implemented by any suitable data storage device capable of supporting memory-related operations.

At block 1202, a data storage device may monitor for an electrical idle broken (EIB) signal responsive to receiving the request (e.g., at block 902 of FIG. 9) and determining that the host device does not support the L1.2 link state (e.g., at block 904 of FIG. 9). In some examples, a host interface module (HIM) may be configured to detect an EIB signal.

At block 1204, the data storage device may set the first power state of the data storage device to an operational power state responsive to a detection of an EIB signal. For example, the data storage device may set an NVMe power state to PS5.

At block 1206, the data storage device may enter a PCI D0 power state responsive to a detection of the EIB signal.

At block 1208, the data storage device may configure the at least one component (e.g., from block 1106 of FIG. 11) to transition from the second power state to the first power state responsive to a detection of an electrical idle broken (EIB) signal.

At block 1210, the data storage device may power on the at least one of the processing core, the memory circuit, or the PLL (e.g., from block 1106 of FIG. 11) responsive to a detection of an electrical idle broken (EIB) signal.

In some aspects, a process in accordance with the teachings herein may include any combination of the above operations.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2*a*, or 2*b*, or 2*c*, or 2*a* and *b*, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
- a non-volatile memory array;
- a peripheral component interconnect (PCI) interface; and
- at least one processor coupled to the non-volatile memory array and the PCI interface and configured to:
  - receive, via the PCI interface, a request from a host device to enter a D3 power state associated with a first reduced power mode where device power is not removed;
  - responsive to the receipt of the request, determine whether the host device supports an L1.2 link state associated with a second reduced power mode where link common mode voltages are not required to be maintained; and
  - set a first power state of the data storage device to a non-operational power state responsive to the receipt of the request and a determination that the host device does not support the L1.2 link state.

2. The data storage device of claim 1, wherein the first power state is a non-volatile memory express (NVMe) power state.

3. The data storage device of claim 2, wherein the non-operational power state is an NVMe PS5 power state.

4. The data storage device of claim 1, wherein the PCI-D3 power state is a PCI express (PCIe) D3hot power state.

5. The data storage device of claim 4, wherein the at least one processor is further configured to:
- enter the PCIe D3hot power state responsive to the receipt of the request and the determination that the host device does not support the L1.2 link state.

6. The data storage device of claim 1, wherein the at least one processor is further configured to:
- set a power management control and status register (PMCSR) to indicate the L1.2 link state responsive to the receipt of the request and the determination that the host device does not support the L1.2 link state.

7. The data storage device of claim 1, wherein the at least one processor is further configured to:
- configure a wake-up circuit for electrical idle broken (EIB) signal detection responsive to the receipt of the request and the determination that the host device does not support the L1.2 link state.

8. The data storage device of claim 7, wherein the at least one processor is further configured to:
- set the first power state of the data storage device to an operational power state responsive to a detection of an EIB signal.

9. The data storage device of claim 1, wherein the at least one processor is further configured to:
- configure at least one component of the data storage device to transition from a first component power state to a second component power state that is associated with lower power consumption than the first component power state responsive to the receipt of the request and the determination that the host device does not support the L1.2 link state.

10. The data storage device of claim 9, wherein the at least one processor is further configured to:

configure the at least one component to transition from the second component power state to the first component power state responsive to a detection of an electrical idle broken (EIB) signal.

11. The data storage device of claim 1, wherein the at least one processor is further configured to:

power off at least one of a processing core, a memory circuit, or a phase-locked loop (PLL) responsive to the receipt of the request and the determination that the host device does not support the L1.2 link state.

12. The data storage device of claim 11, wherein, to power off the at least one of the processing core, the memory circuit, or the PLL, the at least one processor is further configured to:

set or clear at least one bit in at least one register that controls the at least one of the processing core, the memory circuit, or the PLL.

13. The data storage device of claim 11, wherein the at least one processor is further configured to:

power on the at least one of the processing core, the memory circuit, or the phase-locked loop (PLL) responsive to a detection of an electrical idle broken (EIB) signal.

14. A method for controlling at least one power state of a data storage device, comprising:

receiving a request from a host device to enter a D3 power state associated with a first reduced power mode where device power is not removed;

responsive to the receipt of the request, determining whether the host device supports an L1.2 link state associated with a second reduced power mode where link common mode voltages are not required to be maintained; and setting a first power state of the data storage device to a non-operational power state responsive to the receipt of the request and a determination that the host device does not support the L1.2 link state.

15. The method of claim 14, wherein:

the first power state is a non-volatile memory express (NVMe) power state; and the D3 power state is a peripheral component interconnect express (PCIe) D3hot power state.

16. The method of claim 14, further comprising:

monitoring for an electrical idle broken (EIB) signal responsive to the receiving of the request and the determination that the host device does not support the L1.2 link state.

17. The method of claim 16, further comprising:

setting the first power state of the data storage device to an operational power state responsive to a detection of the EIB signal.

18. The method of claim 16, further comprising:

entering a D0 power state responsive to a detection of the EIB signal.

19. The method of claim 14, further comprising:

suspending at least one data storage thread responsive to the receiving of the request and the determination that the host device does not support the L1.2 link state.

20. A data storage device, comprising:

a peripheral component interconnect (PCI) interface;

means for receiving, via the PCI interface, a request from a host device to enter a D3 power state associated with a first reduced power mode where device power is not removed;

means for determining, responsive to the receipt of the request, whether the host device supports an L1.2 link state associated with a second reduced power mode where link common mode voltages are not required to be maintained; and means for setting a first power state of the data storage device to a non-operational power state responsive to the receipt of the request and a determination that the host device does not support the L1.2 link state.

* * * * *